United States Patent [19]
Mixon et al.

[11] Patent Number: 5,960,613
[45] Date of Patent: Oct. 5, 1999

[54] RIDE-ON MOWER HAVING BAG-FULL INDICATOR

[75] Inventors: Laramie Wayne Mixon, Lexington; Dennis A Alexander, Trenton, both of Tenn.

[73] Assignee: Murray, Inc., Brentwood, Tenn.

[21] Appl. No.: 09/083,105

[22] Filed: May 22, 1998

Related U.S. Application Data

[60] Provisional application No. 60/056,244, Aug. 28, 1997.

[51] Int. Cl.⁶ .................................................. A01D 34/70
[52] U.S. Cl. .......................... 56/10.2 R; 56/16.6; 56/202
[58] Field of Search ............................ 56/10.2 A, 10.2 R, 56/10.2 D, 10.5, 10.6, 16.6, 202, 16.8, DIG. 15, 19, 199, 203, 200

[56] References Cited

U.S. PATENT DOCUMENTS

| | | | |
|---|---|---|---|
| 3,715,541 | 2/1973 | Koenig | 200/86 R |
| 4,345,418 | 8/1982 | Arizpe | 56/202 |
| 4,969,320 | 11/1990 | Langfond | 56/16.6 |
| 4,981,011 | 1/1991 | Olejak | 56/10.2 |
| 5,321,939 | 6/1994 | Fuse et al. | 56/16.6 |
| 5,325,650 | 7/1994 | Fuse et al. | 56/10.2 |
| 5,388,394 | 2/1995 | Heismann | 56/194 |
| 5,605,033 | 2/1997 | Olmr | 56/10.2 R |

FOREIGN PATENT DOCUMENTS

| | | | |
|---|---|---|---|
| 0 687 407 A1 | 12/1995 | European Pat. Off. | A01D 34/70 |
| 0 754 402 A1 | 1/1997 | European Pat. Off. | A01D 34/70 |
| 01269423 | 10/1989 | Japan | A01D 34/70 |
| 02131521 | 5/1990 | Japan | A01D 34/70 |
| 04179404 | 6/1992 | Japan | A01D 34/70 |
| 07023644 | 1/1995 | Japan | A01D 34/70 |

*Primary Examiner*—Robert Pezzuto
*Attorney, Agent, or Firm*—Pillsbury Madison & Sutro LLP

[57] ABSTRACT

A lawn mower comprising a frame, an engine mounted on the frame, a cutting mechanism driven by the engine constructed and arranged to cut grass and to generate grass clippings, a bag for collecting said grass clippings, and a bag-full indicating assembly. The bag-full indicating assembly includes an indicator that indicates to a mower operator that the bag is substantially full in response to a bag-full signal, and a switch which can be activated to generate the bag-full signal. The switch comprises a grass-contacting member extending into the bag. The grass-contacting member is movable from a non-activated state to an activated state by being displaced by grass clipping build-up within the bag. The switch thereby enables the bag-full signal for the indicator so that the indicator indicates to the mower operator that the bag is substantially full.

12 Claims, 3 Drawing Sheets

RIDE-ON MOWER HAVING BAG-FULL INDICATOR

This application claims the benefit of U.S. Provisional Application Ser. No. 60/056,244, filed Aug. 28, 1997.

BACKGROUND OF THE INVENTION

The present invention relates to lawn mowers having a grass-clipping collection bag, and in particular to lawn mowers having an indicating assembly for indicating when the collection bag is substantially full.

It is known in the prior art to provide lawn mowers which provide a collection bag for collecting bag clippings. Some of such lawn mowers provide and indicating assembly for indicating to the operator that the collection bag is substantially full and needs to be dumped.

Many mowers provide arrangement wherein a bag full detection will automatically cut-off the mower engine. This design is rather inflexible. For example, this design may cause the engine to shut down when there is only a small amount of grass remaining to be cut, and where the operator would prefer to finish cutting the additional amount prior to dumping the collection bag.

Other indicating assemblies provided with mowers have been unnecessarily complex, expensive, or unreliable. For example, U.S. Pat. No. 5,388,394 discloses a system which detects a build-up in air pressure in a discharge duct. This system does not detect grass clipping levels directly and relies on other factors which may or may not be directly related to a bag-full condition. Other systems, rely on the weight of the collection bag (see U.S. Pat. No. 4,981,011) or a sensor in the mower chute (see U.S. Pat. No. 5,325,650) for detecting a bag-full condition. Another system, disclosed in U.S. Pat. No. 5,321,939 utilizes a relatively expensive light sensor system that provides a bag-full indication when a light-blocking state of the sensor continues for a period of time longer than a predetermined period of time. None of these systems directly detect the level of grass clippings within the bag, and thus do not provide an accurate bag-full indication.

It is an object of the present invention to overcome the problems associated with the prior art noted above. This object is achieved by providing a lawn mower comprising a frame, an engine mounted on the frame, a cutting mechanism driven by the engine constructed and arranged to cut grass and to generate grass clippings, a bag for collecting said grass clippings, and a bag-full indicating assembly. The bag-full indicating assembly includes an indicator that indicates to a mower operator that the bag is substantially full in response to a bag-full signal, and a switch which can be activated to generate the bag-full signal. The switch comprises a grass-contacting member extending into the bag. The grass-contacting member is movable from a non-activated state to an activated state by being displaced by grass clipping build-up within the bag. The switch thereby enables the bag-full signal for the indicator so that the indicator indicates to the mower operator that the bag is substantially full.

In a preferred embodiment, the grass-contacting member comprises an elongate flexible member being in a normally substantially straight configuration and being flexibly bent in response to a build-up of grass clippings within the bag. The elongate flexible member comprises internal conductive contact members disposed in normally spaced non-conductive relation to one another. The conductive contact members are moved into conductive engagement with one another to activate the switch upon flexing of the elongate flexible member to predetermined extent upon build-up of grass clippings in the bag.

It is also an object of the present invention to provide a ride-on mower that achieves the benefits noted above.

DETAILED DESCRIPTION OF THE INVENTION

Figure 1:
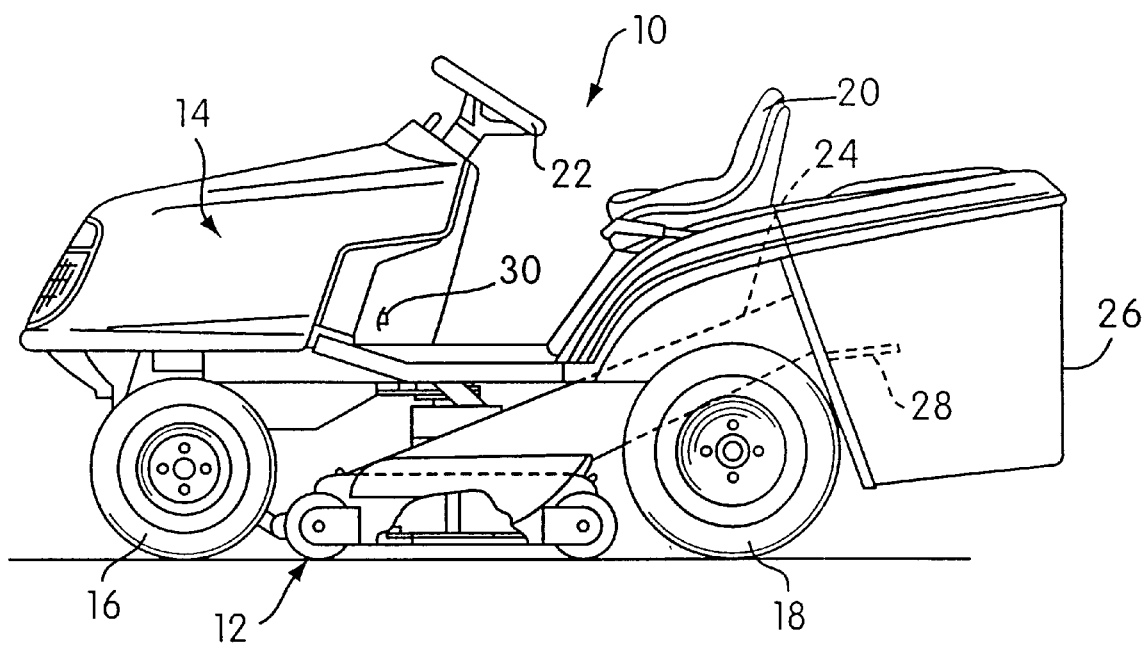
FIG. 1 is a side plan view of a ride-on lawn mower incorporating a bag full indicator in accordance with the principles of the present invention.

FIG. 1 is a side-plan view of a ride-on lawn mower, generally indicated at 10. The mower 10 includes a conventional cutting assembly 12 disposed beneath the engine and body frame assembly 14, and between front and rear wheels 16, 18. The mower is of the ride-on variety, which includes a seat member 20 and a steering wheel 22. As is also conventional, the mower 10 includes a chute 24 leading from the cutting assembly 12 to a rear bag 26 for accumulating cut grass.

In accordance with the principles of the present invention, the mower 10 includes a bag full indicator system, which includes a flex-switch 28 mounted within the bag 26 and an alarm or indicator unit 30 which provides an audible or visual indication to the operator that the bag 26 is full and ready to be emptied. The flex-switch is a grass-contacting member which comes into physical contact with the grass clippings.

Figure 2:
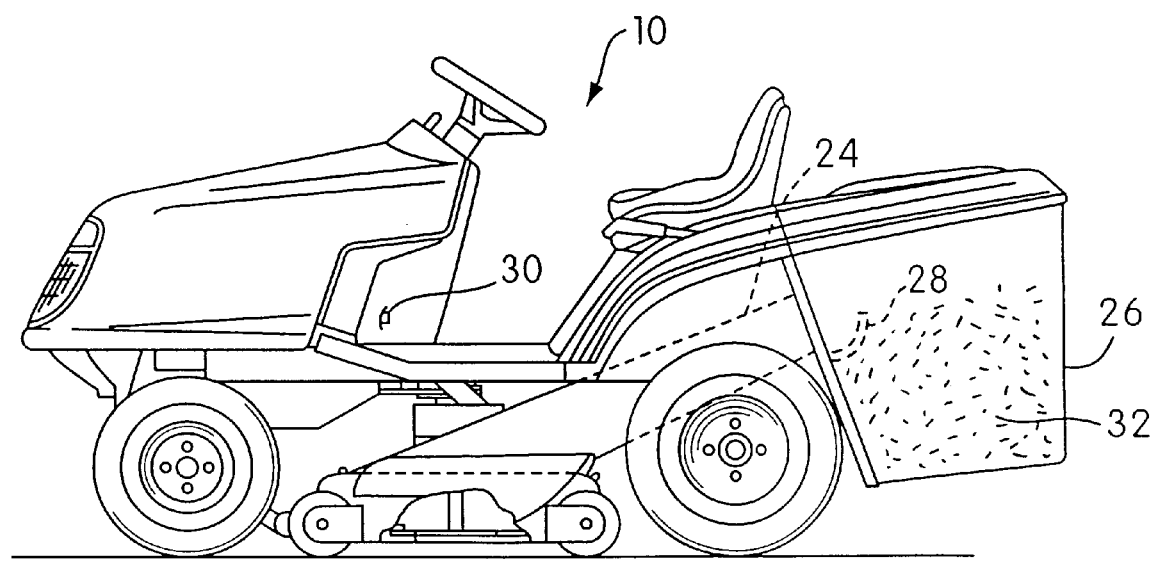
FIG. 2 is a side plan view similar to that shown in FIG. 1, but showing the lawn mower bag filled with grass so as to activate the bag full indicator.

As shown in FIG. 2, when the bag 26 is filled with grass or other cut matter, generally indicated at 32, it eventually reaches the flex-switch 28. When the bag 26 becomes sufficiently full, the flex-switch 28 is flexed or bent upwardly in the manner shown. The flex-switch is bent by being physically displaced by grass build-up within the collection bag. When the flex-switch 28 is bent or flexed beyond a pre-determined amount, it internally closes a circuit so as to energize the indicator 30, which in FIGS. 1 and 2 is in the form of a simple light bulb or LED display. An audio signal may accompany the light indicator, or be provided in lieu thereof.

Figure 3:
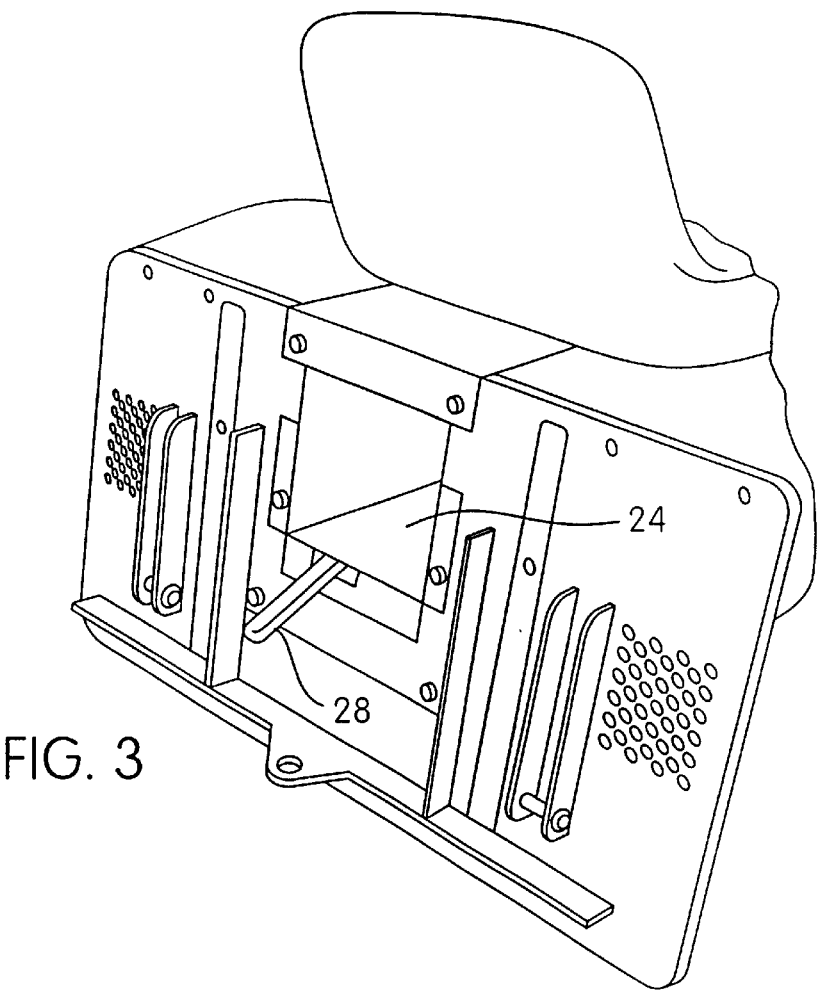
FIG. 3 is a perspective view of the rear portion of the ride-on mower, with the bag removed to show the rear end of the mower chute and the bag full switch in accordance with the present invention.
Figure 4:
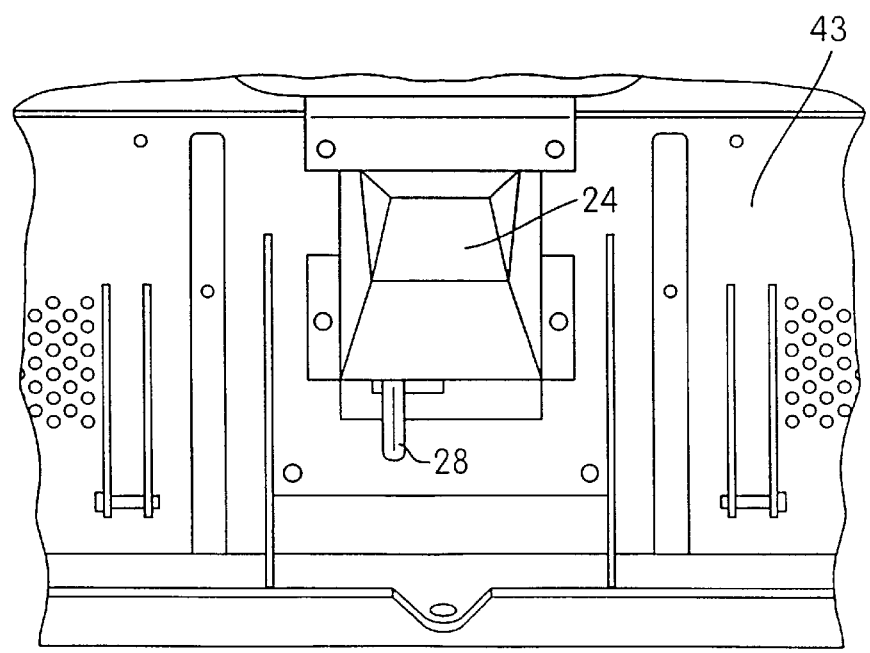
FIG. 4 is a rear plan view of the ride-on lawn mower with the bag removed to illustrate the arrangement of the chute and bag-full indicator switch in accordance with the present invention.

As shown in FIGS. 3 and 4, the flex-switch 28 is mounted immediately below the chute 24. It has been found that this the ideal location for a flex-switch of the nature contemplated by the present invention. In particular, it is found that grass which is expelled from the chute 24 fills the sides and the back of the bag 26 first, and then begins to fill the area immediately beneath the chute towards the end of the filling process. The flex-switch 28 is thus oriented to provide a full indication at a substantially ideal time, and prior to the time at which the chute 24 will become clogged with grass clippings.

The flex-switch 28 is preferably one which is manufactured by Tapeswitch Corporation of Farmingdale, N.Y. Preferably Model No. 180, Flex-Action Ribbon Switch is used.

Figure 5:
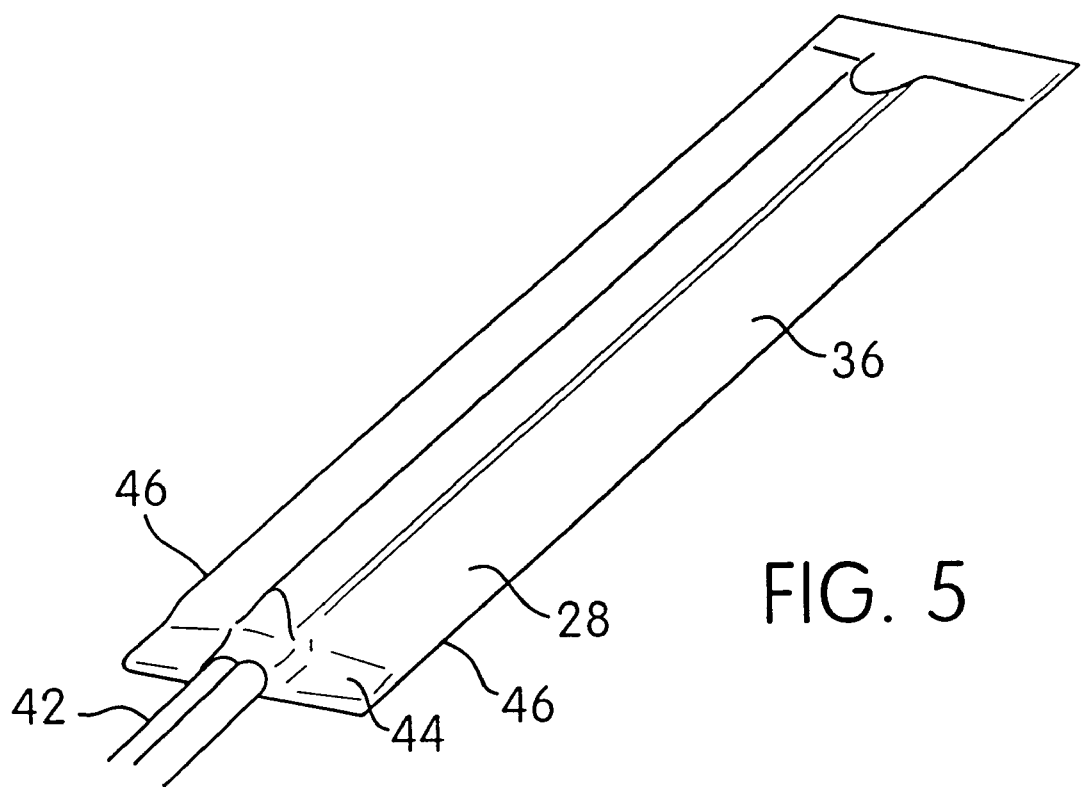
FIG. 5 is a perspective view of the bag-full switch utilized in the present invention.
Figure 6:
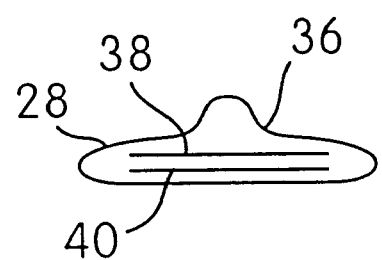
FIG. 6 is a schematic representation of a cross-sectional view of the bag-full indicator switch shown in FIG. 5.

FIG. 6 is a schematic representation of a cross-sectional view of the flex-switch 28 for the purpose of describing the principle of operation. The flex-switch 28 is normally opened switch comprising an elongated flexible rubber sheath 36 which houses a pair elongate metal contact members 38 and 40. The contact members 38 and 40 run substantially along the length of the sheath 36 and are held in normally spaced relation from one another. Upon sufficient flexing of the flex-switch in a direction transverse or perpendicular to its longitudinal extent, the flexible contact members 38 and 40 are brought into contact with one another to close the switch. Once the switch is closed, a signal is sent to the indicator 30 in conventional fashion. As shown in FIG. 5, wires 42 extend outwardly from the sheath 36 for connection to a power source and the indicator 30.

Preferably, the flex-switch (not including the wires 42) preferably has a total length of between about 7–9 inches, and preferably has a length of between 3½–5½ inches of its extent extending beyond the rear metal panel. It should also be noted that the switch works in either direction and flexes downward. It can be appreciated that the length of the flex-switch has a direct effect on the timing of a bag-full indication. More specifically, a longer flex-switch is likely to reach a sufficient amount of bending at an earlier time than a shorter switch. It is found that a flex-switch of the preferred lengths noted above provides for an optimal bag-full indication. It is also preferred that the flex -switch extend substantially horizontally outwardly from its mounting. It can be appreciated that the angle of mounting will also have an effect on the time at which a bag-full indication is given. For example, a flex-switch that angles downwardly from the rear of the mower is likely to be provided with a sufficient bend to indicate a bag-full condition at an earlier timeframe in comparison with a mounting which angles the flex-switch upwardly Lwm DAA. The end of the flex-switch which is mounted through the rear metal panel 43 of the mower is clamped in place, with care being taken that such clamping does not close the switch. For example, such clamping may take place at a rearward end flattened portion 44 of the rubber or resilient sheath 36. This flattened portion 44 does not contain any of the contact elements 38 or 40. As another approach, the side edges 46 of the flex-switch 28 can be clamped or compressed towards one another. The present invention contemplates any sort of mounting which does not effect closure of the tape-switch.

It should be appreciated that the foregoing description and appended drawings are intended to be illustrative in nature, and that the present invention intended to encompass all modifications and equivalents thereof.

What is claimed is:

1. A lawn mower comprising:
   a frame;
   an engine mounted on said frame;
   a cutting mechanism driven by said engine constructed and arranged to cut grass and to generate grass clippings;
   a bag for collecting said grass clippings; and
   a bag-full indicating assembly including an indicator that indicates to a mower operator that the bag is substantially full in response to a bag-full signal, and a switch which can be activated to generate said bag-full signal, said switch comprising a grass-contacting member extending into said bag, said grass-contacting member normally assuming a non-activated state and being moved from said non-activated state to an activated state by being displaced by grass clipping build-up within said bag, said switch thereby enabling said bag-full signal for said indicator so that said indicator indicates to the mower operator that the bag is substantially full; said grass-contacting member comprises a flexible member being flexibly moved in response to a build-up of grass clippings within said bag, said flexible member comprising internal conductive contact members disposed in normally spaced non-conductive relation to one another, said conductive contact members being moved into conductive engagement with one another to activate said switch upon flexing of said flexible member to a predetermined extent upon build-up of the grass clippings in said bag.

2. A lawn mower according to claim 1, wherein said indicator is a visual indicator.

3. A lawn mower according to claim 1, wherein said indicator is an audio indicator.

4. The mower according to claim 1, wherein said mower comprises a chute communicating said cutting mechanism with said bag and providing a passage for said grass clippings to pass from said cutting mechanism to said bag, said chute having an outlet from which said grass clippings are received by said bag, said grass-contacting member having one end thereof fixed below said chute outlet and extending therefrom into said bag.

5. A lawn mower comprising:
   a frame;
   an engine mounted on said frame;
   a cutting mechanism driven by said engine constructed and arranged to cut grass and to generate grass clippings;
   a bag for collecting said grass clippings; and
   a bag-full indicating assembly including an indicator that indicates to a mower operator that the bag is substantially full in response to a bag-full signal, and a switch which can be activated to generate said bag-full signal, said switch comprising an elongate flexible member extending into said bag, said elongate flexible member being in a normally substantially straight configuration and being flexibly bent in response to a build-up of grass clippings within said bag, said elongate flexible member comprising internal conductive contact members disposed in normally spaced non-conductive relation to one another, said conductive contact members being moved into conductive engagement with one another to activate said switch upon flexing of said elongate flexible member to predetermined extent upon build-up of grass clippings in said bag to thereby enable said bag-full signal for said indicator, so that said indicator indicates to the mower operator that the bag is substantially full.

6. The mower according to claim 5, wherein said mower comprises a chute communicating said cutting mechanism with said bag and providing a passage for said grass clippings to pass from said cutting mechanism to said bag, said chute having an outlet from which said grass clippings are received by said bag, said elongate flexible member having one end thereof fixed below said chute outlet and extending therefrom into said bag.

7. A lawn mower according to claim 5, wherein said indicator is a visual indicator.

8. A lawn mower according to claim 5, wherein said indicator is an audio indicator.

9. A ride-on lawn mower comprising:

a frame;

a seat mounted on said frame;

wheels mounted on said frame;

an engine mounted on said frame for driving said wheels;

a steering wheel mounted with respect to said frame for turning said wheels and steering said lawn mower;

a cutting assembly driven constructed and arranged to cut grass and to generate grass clippings;

a bag for collecting said grass clippings; and a bag-full indicating assembly including an indicator that indicates to a mower operator that the bag is substantially full in response to a bag-full signal, and a switch which can be activated to generate said bag-full signal, said switch comprising a grass-contacting member extending into said bag, said grass-contacting member normally assuming a non-activated state and being moved from a non-activated state to an activated state by being displaced by grass clipping build-up within said bag, said switch thereby enable said bag-full signal for said indicator so that said indicator indicates to the mower operator that the bag is substantially full; said grass-contacting member comprises a flexible member being flexibly moved in response to a build-up of grass clippings within said bag, said flexible member comprising internal conductive contact members disposed in normally spaced non-conductive relation to one another, said conductive contact members being moved into conductive engagement with one another to activate said switch upon flexing of said flexible member to a predetermined extent upon build-up of the grass clippings in said bag.

10. A ride-on lawn mower according to claim 9, wherein said indicator is a visual indicator.

11. A ride-on lawn mower according to claim 9, wherein said indicator is an audio indicator.

12. The ride-on lawn mower according to claim 9, wherein said mower comprises a chute communicating said cutting mechanism with said bag and providing a passage for said grass clippings to pass from said cutting mechanism to said bag, said chute having an outlet from which said grass clippings are received by said bag, said grass-contacting member having one end thereof fixed below said chute outlet and extending therefrom into said bag.

\* \* \* \* \*